Jan. 24, 1933.    J. N. BORROUGHS    1,895,068
TOY
Filed Nov. 14, 1930
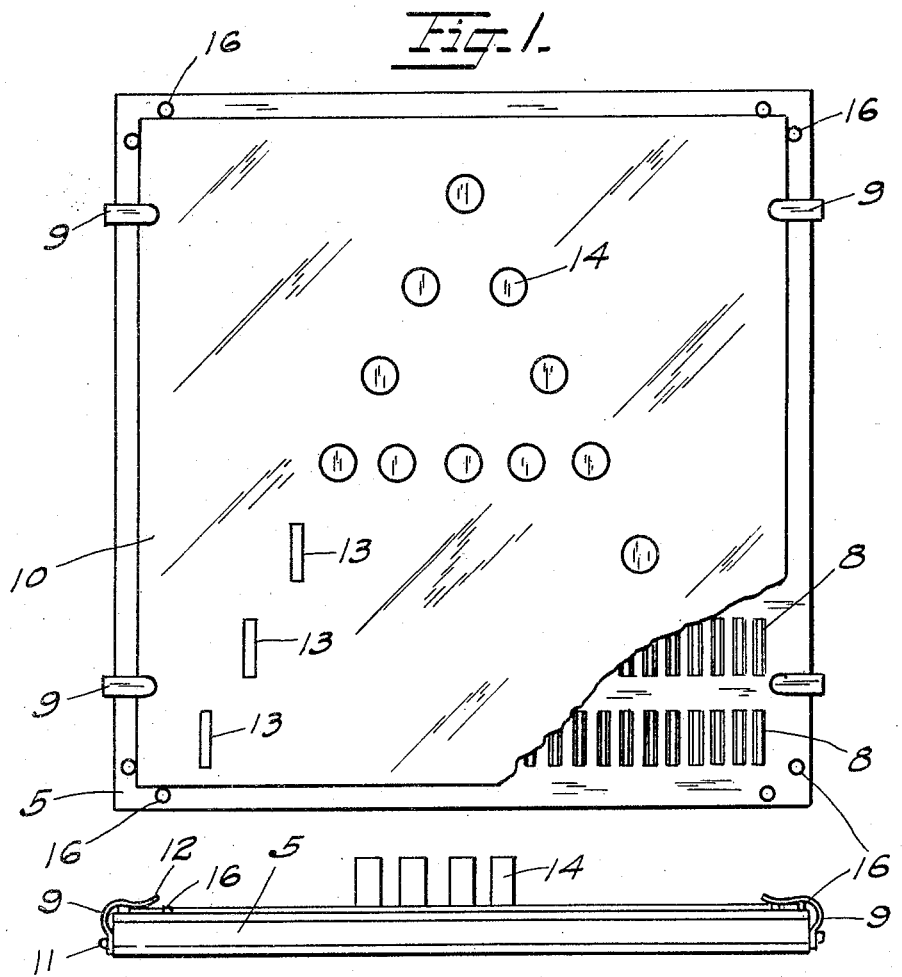
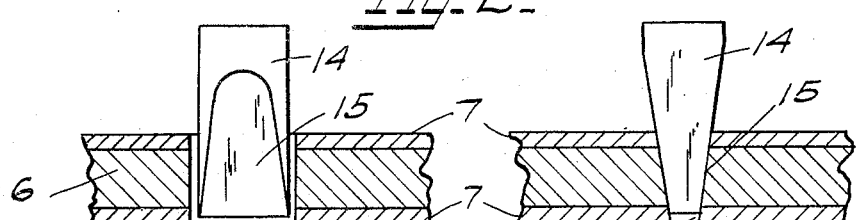

Patented Jan. 24, 1933

1,895,068

UNITED STATES PATENT OFFICE

JOSEPH N. BORROUGHS, OF OAKLAND, CALIFORNIA

TOY

Application filed November 14, 1930. Serial No. 495,695.

This invention is for an educational toy, and has for its main object the provision of a toy which is both amusing and instructive for small children.

Another object of the invention is to provide a toy or game as described, by which the various letters of the alphabet may be formed by means of pegs, which are to be driven into slots and which can readily be removed by the child when desired.

A further object of the invention is to provide a device by which the inherent fondness of a child for using a hammer or mallet may be satisfied, by supplying a medium in which pegs may be driven and readily removed.

Other objects and advantages of the invention will become apparent as the following description is read on the drawing forming a part of this specification.

The invention consists primarily of a board having a multiplicity of tapered rectangular apertures formed therethrough, a plurality of pegs frictionally fitting said apertures, a paper pattern adapted to be retained in position on the board and having indicators imprinted thereon, for forming letters or figures by means of the pegs driven into the apertures registering with the indicators, the board having spring clips for retaining the pattern in position.

The invention is adequately illustrated in the accompanying drawing in which:

Fig. 1 is a plan view of the invention with part of the pattern torn away;

Fig. 2 is an end elevation of the invention;

Fig. 3 is an enlarged sectional view taken longitudinally through one of the apertures; and Fig. 4 is an enlarged sectional view taken transversely through one of the apertures.

Similar reference characters are used to designate similar parts throughout the several views.

The invention consists of a board 5 preferably built up of several plies of wood, having the grain of the central section 6 transversely to the grain of the top and bottom sections 7, to prevent splitting and warping.

A multiplicity of rectangular apertures 8 are formed through the board in spaced relation, the apertures being tapered, and diverging from bottom to top as clearly illustrated in the enlarged section, Fig. 4.

Affixed to the sides of board 5, a plurality of spring clips 9 are provided for retaining a paper pattern 10 in position on the board 5, and consists of an arcuately formed flat spring attached by means of screw 11, and having the end 12 turned upward, whereby the spring may be released by the fingers for insertion of the pattern 10 thereunder.

The pattern consists of a sheet of paper 10 having rectangles 13 printed thereon adapted to register with certain of the apertures 8, and forming a letter or figure, that in the drawing being for the letter A. A plurality of pegs 14 of a diameter less than the length of apertures 8 are provided, having one end tapered as at 15 to the same taper as provided in apertures 8. Locators 16 in the form of small buttons or pegs are provided for properly locating the pattern 10.

A small hammer or mallet is provided whereby a child may promiscuously drive pegs into the apertures, or, by placing a pattern 10 in position and driving pegs into apertures in registry with the rectangular imprints 13, a letter or figure is outlined by the pegs 14.

Having described an operative method of constructing and using the device, it will be understood that variations in form, construction and arrangement may be resorted to which are consistent with the scope of the appended claims, and that such variations will not detract from the spirit or scope of the invention or sacrifice any of its advantages.

I claim:—

1. Means for positioning and securing a superposed rectangular diagram sheet on a base comprising a positioning pin for each side of each corner of the sheet and secured in the base, for positioning the sheet, and inwardly projecting spring fingers secured to the base and cooperating therewith and having the inner ends upturned whereby the sides of the sheet may be inserted between the fingers and the base and frictionally retained therebetween.

2. A base board provided with aligning means and securing means for a superposed rectangular diagram sheet, said aligning means comprising projections of cylindrical form adapted to cooperate with each edge of the sheet adjacent each corner, said securing means resiliently cooperating with the base board and adapted to slidably receive, and resiliently secure, the sides of the sheet.

In testimony whereof I have affixed my signature.

JOSEPH N. BORROUGHS.